(12) United States Patent
Neuman

(10) Patent No.: US 6,744,974 B2
(45) Date of Patent: Jun. 1, 2004

(54) DYNAMIC VARIATION OF OUTPUT MEDIA SIGNAL IN RESPONSE TO INPUT MEDIA SIGNAL

(76) Inventor: Michael Neuman, c/o Research Studios 696 Sacramento St., Third Floor, San Francisco, CA (US) 94111

( * ) Notice: Subject to any disclaimer, the term of this patent is extended or adjusted under 35 U.S.C. 154(b) by 0 days.

(21) Appl. No.: 10/242,447

(22) Filed: Sep. 13, 2002

(65) Prior Publication Data

US 2003/0103076 A1 Jun. 5, 2003

Related U.S. Application Data

(60) Provisional application No. 60/322,944, filed on Sep. 15, 2001.

(51) Int. Cl.[7] .............................. H04N 7/04; H04N 5/91
(52) U.S. Cl. .............................. 386/96; 386/75; 386/68
(58) Field of Search .............................. 386/96, 95, 46, 386/68, 69, 67, 52, 55, 1, 4, 6, 75; 360/32, 13; H04N 7/04, 5/91

(56) References Cited

U.S. PATENT DOCUMENTS

| | | |
|---|---|---|
| 3,038,061 A | 6/1962 | O'Reilly |
| 4,305,131 A | 12/1981 | Best |
| 4,538,188 A | 8/1985 | Barker et al. |
| 5,065,345 A | 11/1991 | Knowles et al. |
| 5,430,495 A | 7/1995 | Ko |
| 5,555,098 A * | 9/1996 | Parulski |
| 5,589,945 A * | 12/1996 | Abecassis |
| 5,676,551 A | 10/1997 | Knight et al. |
| 5,680,534 A | 10/1997 | Yamato et al. |
| 5,684,714 A | 11/1997 | Yogeshwar et al. |
| 5,854,634 A | 12/1998 | Kroitor |
| 5,872,564 A | 2/1999 | Snibbe et al. |
| 5,880,788 A | 3/1999 | Bregler |
| 5,886,710 A | 3/1999 | Snibbe |
| 5,953,485 A | 9/1999 | Abecassis |
| 5,999,173 A | 12/1999 | Ubillos |
| 5,999,185 A | 12/1999 | Kato et al. |
| 6,067,126 A | 5/2000 | Alexander |
| 6,184,937 B1 | 2/2001 | Williams et al. |
| 6,188,830 B1 | 2/2001 | Mercs et al. |
| 6,204,840 B1 | 3/2001 | Petelycky et al. |
| 6,320,598 B2 | 11/2001 | Davis et al. |

* cited by examiner

Primary Examiner—Robert Chevalier
(74) Attorney, Agent, or Firm—Greenblum & Bernstein, P.L.C.

(57) ABSTRACT

A first input signal, which has a first playback sequence, is resequenced based upon a characteristic of a second input signal. The resequencing occurs analyzing the characteristic in the second input signal, and modifying the first playback sequence of the first input signal based upon the analysis of the characteristic to generate a second playback sequence. Finally, a third signal is output using the second playback sequence.

37 Claims, 3 Drawing Sheets

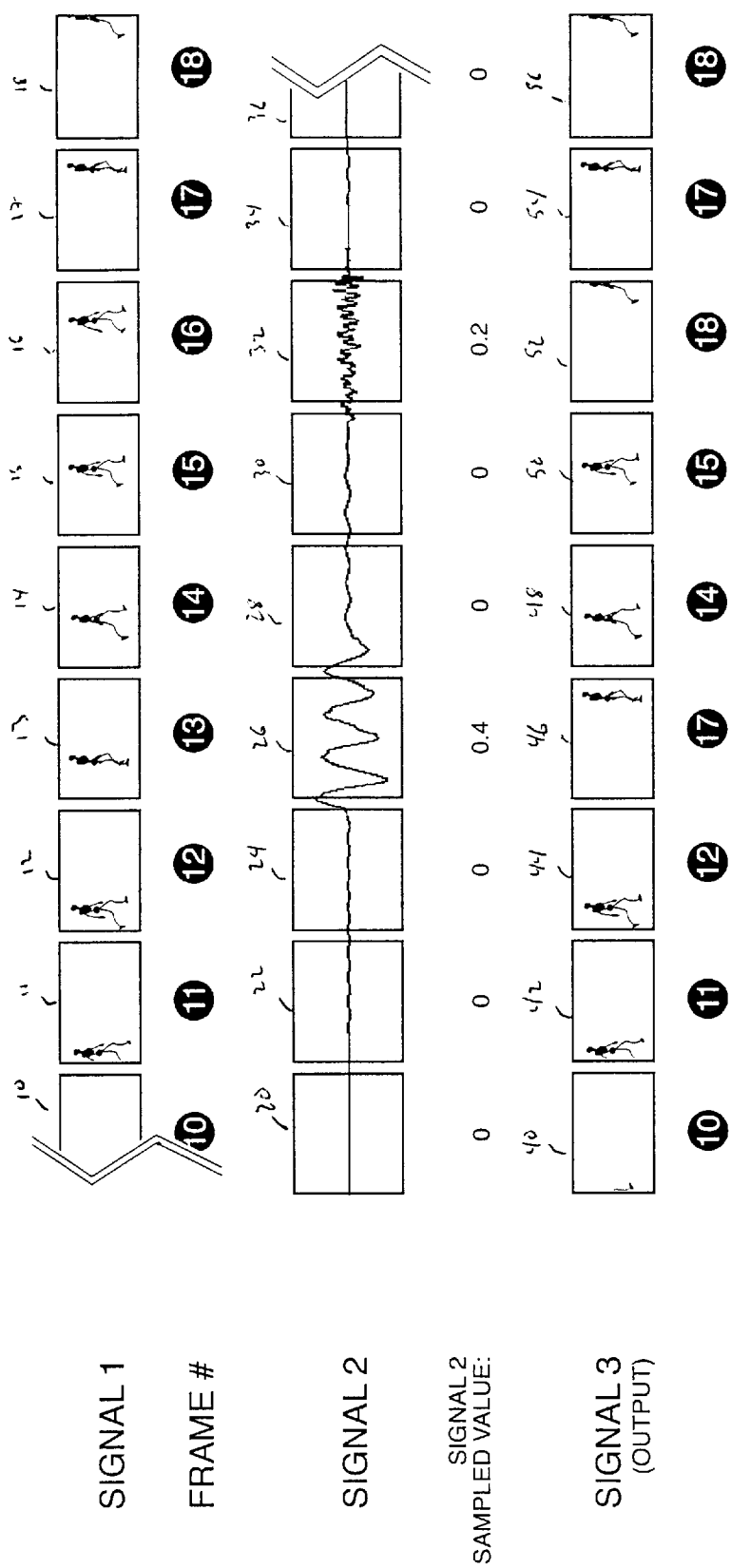

DYNAMIC VARIATION OF OUTPUT MEDIA SIGNAL IN RESPONSE TO INPUT MEDIA SIGNAL

CROSS-REFERENCE TO RELATED APPLICATION

This application claims the benefit of U.S. provisional patent application No. 60/322,944 entitled "System and Method for Creating Multimedia", filed Sep. 15, 2001, in the names of NEUMAN et al., the disclosure of which is expressly incorporated herein by reference in its entirety.

BACKGROUND OF THE INVENTION

1. Field of the Invention

The present invention relates to multimedia. More specifically, the present invention relates to creating an output media signal based upon an input media signal.

2. Background Information

The combination of audio and video has become a popular means of entertainment in film, television, video games, computers, PDAs, the internet, kiosks, karaoke, ambient environments, and live events. It is extremely desirable to correlate a moving image to a sound track, or vice versa. This technique is demonstrated in film, television, music videos, video games, web sites, cartoons, clubs, events, concerts, light shows, CD-ROMs, art installations, etc.

Current technology requires the user to manually edit a moving picture with a soundtrack, either by editing frames or altering the playback rate of the audio or video. This process requires highly skilled users to work with complex editing tools and understand music structure so as to edit in synchronicity with a sound track. This traditional editing process is both very expensive and time consuming. In fact, one of the more costly and time consuming aspects of professional production of film, video, and multimedia is synchronizing audio and video sources.

Recent developments in home consumer level systems capable of playing and manipulating video has created a demand for an editing system that creates motion pictures synchronized to an audio track. This process is too complicated for the average user to perform utilizing current technologies. Under the status quo, a user has to correlate an audio track to moving images by either:

1. Simultaneously capturing audio and motion pictures, which has significant problems; In order to have a correlation between the images and the audio, elaborate pre-production choreography is required; Another disadvantage of this simultaneous audio/video capture is that the audio and video become dependent; This restricts the user from easily changing either the audio or video of the synchronized piece; or 2. Manually editing a motion picture, cutting scenes in relation to changes in a soundtrack; This technique requires the user to detect appropriate cues in a soundtrack, such as a snare drum, and then edit the picture at that moment in time; Changes in the picture or audio portions of the program require manually re-setting these in and out points, or utilizing a semi-automated technology whereby the user has to manually correlate the sound cue to the desired frame and lock the relationship in the time line.

At live events, video is frequently used to enhance the viewer's experience. Current technology allows only basic automated visual effects in response to audio. This is demonstrated by strobing lights and lasers triggered by audio characteristics or, in the case of video, image manipulation of color, hues or similar attributes. More complex correlations between audio and motion pictures typically utilize a process in which a user pre-programs video effects, and manually triggers such effects through an input device, such as a keyboard, mouse, or trackball. The status quo lacks tools for generating real time video content derived from dynamic media signals, which do not require analysis or input from a user.

The creation of a series of still images synchronized with a soundtrack requires manually setting the image frame rate to the tempo of the audio. Changing the audio to synchronize to the picture requires the user to edit the sound or manually alter the playback rate. Audio with an inconsistent tempo requires the user to manually determine where significant audio cues reside and edit the still images to this sequence. Any changes in audio require the process to be repeated for the modified portion.

The ability to quickly, simply and iteratively produce new media content is of special interest in contexts such as movie making. In particular, home consumer production of movie content suffers from the lack of easy to use yet powerful composition tools that do not require video or audio analysis by the user. Currently there are no tools that allow the user to easily synchronize or edit a motion picture or series of still images to an unrelated audio track or tracks. In addition, there is no mechanism by which pre-existing recordings can be easily and efficiently combined to present the desired effect. This is particularly true for non-professionals.

In summary, there is a need for a time-based media processing system that is capable of providing high-quality, adaptive media productions without requiring a significant level of skill on the part of the user, and is therefore suited for use by both the professional and average consumer. There would be great utility in a tool in which two unrelated media signals can be combined to create a motion picture synchronized to a sound track or other media signals and vice versa.

SUMMARY OF THE INVENTION

According to an aspect of the invention a method and a computer readable medium are provided for resequencing a first input signal, which has a first playback sequence, based upon at least one characteristic of a second input signal. The method and medium both include analysis of the characteristic of the second input signal, and modifying of the first playback sequence of the first input signal to generate a second playback sequence. The modification occurs based upon the analysis. In addition, a third signal including the second playback sequence is output.

In one embodiment, the first input signal is a video signal, the second input signal is an audio signal, and the third signal is a video signal. In another embodiment, the first input signal and the second input signal are the same signal. It is possible that the analyzing and the outputting occur in real time. Further, the second input signal can be output along with the third signal. The analyzing can occur at a frequency based upon a frame rate of the first input signal. The modifying can also include altering a frame rate.

In another embodiment, the first input signal is actually multiple input video signals, each having a linear playback sequence, and the third signal is actually multiple output video signals. The characteristic is actually multiple characteristics, each being associated with one of the input video signals. In this embodiment, the modifying requires modifying of a linear playback sequence of each of the input video signals based upon the analysis of the associated characteristics to generate an output sequence. The outputting also requires outputting each output video signal in accordance with its output sequence.

In another embodiment, the first input signal includes multiple layers, as does the third signal. Similarly, the characteristic includes multiple characteristics, each being associated with one of the layers. In this embodiment, the modifying includes modifying a layer playback sequence of each of the layers based upon the analysis of the associated characteristics to generate an output layer sequence. Finally, the outputting requires outputting of each layer in accordance with its output layer sequence.

According to another aspect, a method and a computer readable medium are provided for resequencing a first input signal based upon at least one characteristic of a second input signal. The first input signal has a series of frames, each having a frame number. The method and computer readable medium include analyzing the characteristic of the second input signal. They also include calculating, for each frame in the series of frames, an offset based upon the analyzing. The offset is then added to the frame number to obtain an output frame number. Finally, a third signal is output in a playback sequence using the output frame numbers.

According to another aspect, a method and a computer readable medium are provided for outputting a signal based upon at least one characteristic of an input signal. The method and medium require analysis of the at least one characteristic of the input signal. They also require control of an external device based upon the analysis of the at least one characteristic, and output of the signal using the controlled external device.

BRIEF DESCRIPTION OF THE DRAWINGS

The present invention is further described in the detailed description that follows, by reference to the noted drawings by way of non-limiting examples of embodiments of the present invention, in which like reference numerals represent similar parts throughout several views of the drawing, and in which:

FIG. 2 shows exemplary video frame substitution based upon an audio signal, according to an aspect of the present invention.

DETAILED DESCRIPTION OF THE INVENTION

Figure 1A:
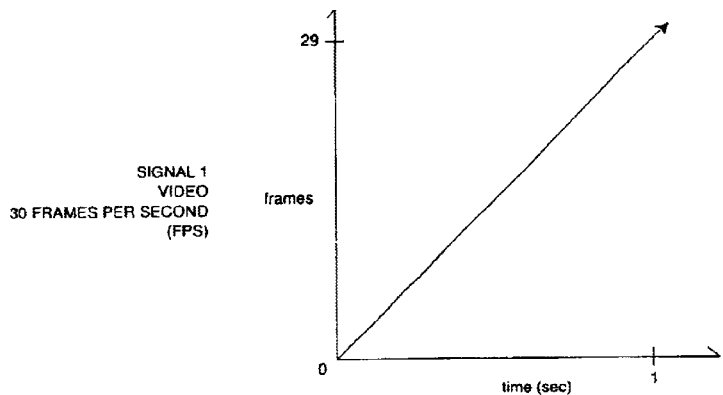
FIGS. 1A, 1B, and 1C are graphs plotting source video, source audio and output video, respectively, against time.

In view of the foregoing, the present invention, through one or more of its various aspects, embodiments and/or specific features or sub-components, is thus intended to bring out one or more of the advantages as specifically noted below.

In the following description, for purposes of explanation, numerous specific details are set forth in order to provide a thorough understanding of the present invention. It will be evident, however, to one skilled in the art that the present invention may be practiced without the specific details. In other instances, well-known structures and devices are shown in block diagram form to facilitate explanation. The description of preferred embodiments is not intended to limit the scope of the appended claims.

An object of the invention is to enable new efficiencies, methods, and forms in the production of media content. The invention also aims to satisfy a need for a media processing system that reduces the labor and expertise necessary to create media content. Real time applications of this invention can immediately provide visual feedback from audio input as an essential aid to the production and creation of multimedia.

The invention may be used to help visualize audio segments with non associated video segments. Individual tracks can be visualized to help illustrate the behavior of a musical instrument, a voice or a sound effect. Multiple images can be shown simultaneously to separate, similar to a graphic equalizer, the complexity and dynamics of an audio segment. In another embodiment, video images may be layered with each layer containing a separate object. Each layer may be individually controlled by the system so that different objects are graphically manipulated by different discrete media signals.

Aspects of the present invention may be implemented on one or more computers executing software instructions, or may be encoded onto read only memory, PROM, EPROM, firmware, or circuitry for use in an electronic apparatus. According to one embodiment of the present invention, server and client computer systems transmit and receive data over a computer network or standard telephone line. The steps of accessing, downloading, and manipulating the data, as well as other aspects of the present invention are implemented by central processing units (CPUs) in the server and client computers executing sequences of instructions stored in a memory. The memory may be a random access memory (RAM), read only memory (ROM), a persistent storage, such as a mass storage device, or any combination of these devices. Execution of the sequences of instructions causes the CPU to perform steps according to embodiments of the present invention.

The instructions may be loaded into the memory of the server or client computers from a storage device or from one or more other computer systems over a network connection. For example, a client computer may transmit a sequence of instructions to the server computer in response to a message transmitted to the client over a network by the server. As the server receives the instructions over the network connection, it stores the instructions in memory. The server may store the instructions for later execution, or it may execute the instructions as they arrive over the network connection. In some cases, the downloaded instructions may be directly supported by the CPU. In other cases, the instructions may not be directly executable by the CPU, and may instead be executed by an interpreter that interprets the instructions. In other embodiments, hardwired circuitry may be used in place of, or in combination with, software instructions to implement the present invention. Thus, the present invention is not limited to any specific combination of hardware circuitry and software, nor to any particular source for the instructions executed by the server or client computers.

In one embodiment, the invention alters a single media signal or a combination of two or more media components into a modified presentation. In an embodiment, the system analyzes a second media file and samples a characteristic of the second media file. For example, the second media file may be an audio file that is analyzed for any sounds that exceed a pre-set decibel threshold. In this example, a derivative file would store all times when the decibel threshold has been exceeded, as well as the amount by which the decibel levels were exceeded. If the second media file is a stream, i.e., real time, instead of a file, the derivative file would simply be a single value resulting from a real time analysis occurring at the sampled frequency.

An output media file is then formed based upon the first media signal and the analysis of the second media signal (i.e., the derivative file). That is, the derivative file is used to modify the output file. Additionally, the derivative file can be used to control an external device containing the first media signal. Examples of this device are a direct disk recorder (DDR), such as TIVO, and a DVD player. Finally, the second media file and the output media file are played together. Specifically, when the derivative file so indicates, the system rearranges the playback sequence of frames of the first media file. In one embodiment, the output signal is a modified media presentation having multiple media components.

Figure 1B:
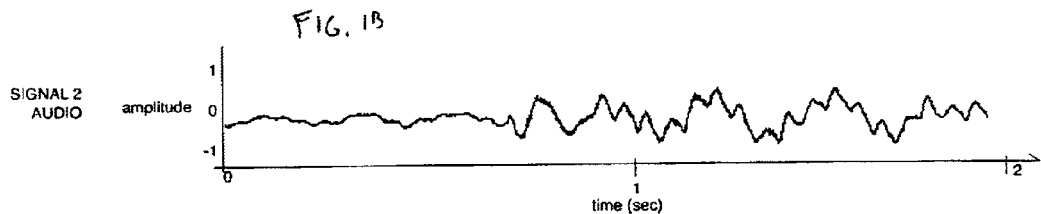
Figure 1C:
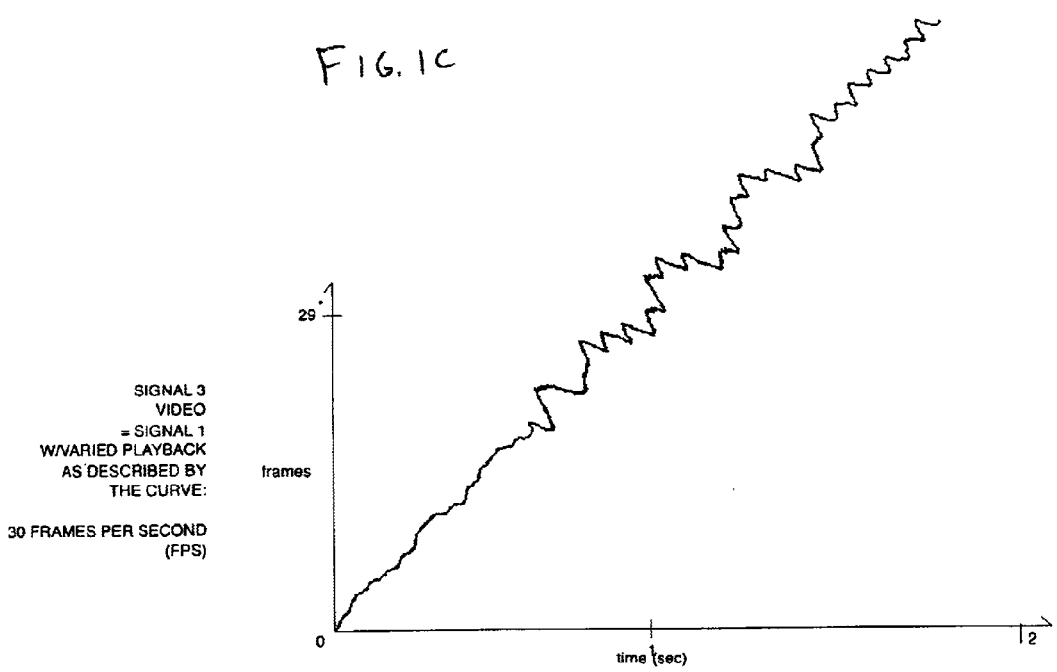

An example is now provided with reference to FIGS. 1A, 1B, and 1C in which a sequence of frames in a video signal is altered based upon a detected amplitude of an audio signal. FIG. 1A shows standard source video playback as a linear sequence of frames over time. FIG. 1B shows an amplitude of an audio signal as it varies with time. As shown in FIG. 1C, the output signal is created from a non-linear reassembly of frames of the source video so that each frame correlates the amplitude of the audio with the future/past frames of the source video.

In an audio and video media signal embodiment, the video signal may include moving objects appearing to move in a non-linear manner in sync with a media, which may be the audio file. For example the movement of the objects in the video may appear to move to the beat of the audio track.

Normally, audio and video files are played in a specific sequence that replicates a recorded source subject, which may be a musical instrument performance or a movement of objects. The sequence of sounds replicates music and the sequence of pictures shows a visual representation of moving figures. Electronic audio files have a preset sampling rate at which specific sounds are sequentially emitted by an audio file player. Similarly, video files also have a preset frame rate at which a specific sequence of video frames are displayed by a media player. Because the audio sample rate and video frame rate may be fairly high, e.g., 160 kbs/second or higher and 30 frames/second, respectively, the human ears and eyes cannot distinguish the breaks between the tones and picture frames.

As an example, the media signal may be a drum sound that defines the beat of the song of an audio file. The inventive system can define the drum sound as the characteristic and sample this characteristic while playing the audio file normally. When the audio and video tracks are played together, the inventive system will automatically alter the sequence of the video file based upon the characteristic of the audio signal. Specifically, the video frame that would normally be displayed at the time of the characteristic (i.e., the beat) is not displayed and an alternate substitute video frame is displayed in its place. In addition, each and every frame could be reordered.

In other embodiments, any other type of media signal characteristic may be used to trigger the non-linear playback of a media signal. For example, because a video signal may be completely independent of an audio signal, the picture and sound files used by the system can be associated or completely disassociated. An example of associated audio and video signals is a musical performance featuring audio and video recordings of the musical performance. An example of disassociated audio and video files is a song and unrelated video footage of a sporting event. The system does not rely upon synchronizing markers in both the audio and video and is therefore compatible with any media signal, such as an audio file and a video file, as long as one of the files has a characteristic off which the system can trigger.

In an embodiment, a substitute frame is a frame that is close in sequence to the frame that would normally be displayed. For example, the system may display a video frame that is a few frames ahead of or behind the frame that would normally be displayed. This substitution of an out of sequence frame creates an effect where objects appear to be moving normally in a linear manner and then when the audio signal characteristic is detected, a non-sequential video frame or frames are displayed between the sequential frames. The non-sequential frames may be ahead of or behind the normally next sequential frame. If the non-sequential frame is ahead of the normal sequence, the video will appear to jump forward at the moment of the audio signal characteristic. Similarly, if the non-sequential frame is behind the normal sequence frame, the video will appear to jump backwards.

In yet another embodiment, the frame or frames displayed when the audio signal characteristic is detected may be displayed multiple times creating a temporary freezing of motion. When the audio characteristic has passed, the video returns to its normal linear playback until the next discrete audio signal is detected. The effect is a pulsation in the normally linear motion of the video that is synchronized with the audio signal characteristic.

An embodiment will now be described with reference to FIG. 2. A first signal 1, which is a video signal in this example, includes multiple frames. In FIG. 2, frames 11–18 are shown with corresponding frame numbers 11–18 (Frame 10 is only partially shown). A second signal 2 is an audio signal in this example. A characteristic of the audio signal 2, e.g., an amplitude, may be sampled. In FIG. 2, the first three sampling periods 20, 22, 24 the audio signal has an amplitude of 0. Thus, because no characteristic is detected, an output signal 3 is the same as the input signal 1. In other words, frame numbers 10, 11, and 12 are displayed at frames 40, 42, 44. At the time of the fourth sampling 26, an amplitude of 0.4 is detected. Thus, a substitute frame 46 (frame number 17) is displayed instead of the normally displayed frame 13 of the video signal 1. In other words, the output signal 3 displays frame numbers 10, 11, 12 and 17, in this order. Display of frame 17 is ahead of the normal sequence and thus, it will appear that the character has jumped ahead of where he would be expected to be.

At the fifth and sixth sampling periods 28, 30 the amplitude has returned to 0. Thus, the next output frames 48, 50 will again correspond to the video signal 1 at those times (i.e., frame numbers 14 and 15 are displayed). At the time of the seventh sampling period 32, an amplitude of 0.2 is detected. Thus, a substitute frame 52 is displayed instead of the normally displayed frame number 16 of the video signal 1. In other words, the output signal 3 displays frame numbers 10, 11, 12, 17, 14, 15, and 18 in this order. Display of frame 18 is not in the normal sequence and thus, it will appear that the character has again jumped ahead of where he would be expected to be. At the eighth and ninth sampling periods 34, 36 the amplitude has returned to 0. Thus, the next output frames 54, 56 will again correspond to the video signal 1 at those times.

Various effect modifications can be made to the described system. For example, the magnitude of the jump in the non-sequential video frame can be controlled by the user of the system. This offset can be dynamic and can be controlled to grow, shrink, oscillate, decay, delay, drift and sustain.

In an alternative embodiment, a single media signal may be used. In this embodiment, the system detects characteristics in the single media signal. The system may alter the output signal of the single media signal based upon the detected characteristics in the same media. For example in a video signal, any of the video effects may be applied to the video media upon the detection of a characteristic in the same video signal. Thus, the system may utilize a single media source to produce an altered output media signal.

In another embodiment, a video frame from a video source other than the second video signal may be the substituted frame(s) displayed when the audio characteristic is detected. In this embodiment, the second video file may be any other type of visual data including but not limited to: a 2-D file, 3-D data, and a live video feed. When the other video source is an animation file, the animation file may be controlled by the system so that the graphical display is altered when an audio characteristic is detected.

Because 2-D and 3-D computer graphics programs continuously display a composite image rather than a series of sequential frames, the inventive system will operate in a different manner when applied to such a program. For example, the motion of each displayed object may be individually controlled. Thus, the control of individual components may correspond to different characteristics. In an embodiment, a first object may be altered by a first characteristic and a second object may be altered by a second characteristic. For example, the first object may appear to bounce in response to the first characteristic and the second object may be enlarged in response to the second characteristic. Any number of visual effects may be applied to the 2-D or 3-D objects including movement, appearance, camera angle, shape, etc.

In another embodiment, the visual display may be a layered composite of visual frames. Each of the frame layers may contain a separate object and each layer may be individually manipulated in response to detecting of a characteristic. By varying only some of the frames of the composite, only objects illustrated in the layers are visually altered. For example, the first layer may include a background of mountains, a second layer may include trees and a lake, a third layer may include an airplane and the fourth layer may include a car. The mountain layer may be altered by a bass audio signal, the trees and lake layer may be altered by a mid frequency audio signal. The airplane layer maybe altered by a high frequency audio signal and the car layer may be altered by a discrete audio signature. The visual effect would show individual objects appearing to be independently altered by different characteristics.

In yet another embodiment, the frame rate can be altered, so that the display rate is higher or lower than the normal 30 frames/second. An offset calculation determined from signal 2 (described below) can be used to vary the playback rate. When a characteristic is detected, the system may temporarily accelerate the playback speed to 150 frames/second. The accelerated frames may be the normal sequential video frames, substitute frames or a visual file from another source or multiple other sources. The visual effect of displaying multiple frames at a faster rate would be acceleration, because the velocity of objects displayed increases. Conversely, if the frame rate is slowed, the visual effect would be a deceleration of moving objects. Of course, this frame rate effect can be applied to a single region visual display, a layered visual display or a multiple region visual display.

In another embodiment, multiple frames can be displayed in the time allotted for a single frame. Similarly, partial frames or blended frames may be inserted as substitute frames in a sequence of video frames.

One preferred embodiment of the invention is implemented as a set of software instructions on a computer. In this manifestation, the invention analyzes an audio signal. that may be either analog or digital. Exemplary audio formats include stereo, mono, and multiple track signals, such as MP3, Quicktime, soundedit, MIDI, IMA, WAV, AIFF, Sound designer II, sun .au, or any format that may be developed in the future. Sound can be live, pre-recorded, or transmitted through airwaves or dedicated lines, such as the internet, a LAN or a WAN. The audio signal can contain multiple tracks, and the invention can discern individual (split) tracks (e.g.,—a drum track residing in a multi-track composition or score). The invention can accept signals from microphones, audio tapes (e.g., DAT and cassette), video tapes with sound tracks, CD, DVD, MIDI devices, mini disc or any future sound technologies.

The characteristic being detected can also be located in a signal created by a user. The user created signal could be employed when the actual audio signal does not provide the intended effect. That is, the user created signal can be used to achieve the intended effect. In this case, the user can select or alter specific characteristics of an audio track, for example its tempo, tone, beat, pitch, duration, carrier frequency, scale or volume. The user can also adjust the amplitudes of specific sound frequencies and can shift the pitch of the audio. In addition, the user can generate a tone (by specifying a frequency, amplitude and shape) and can insert the tone at any point in time. Such a user created signal can be recorded or can be live. An alternative user-created signal can include a duplicate of an existing audio track, the duplicate being subject to a user selected audio filtration. In this case, the original unmodified audio track and a modified track can both exist. After the user created signal has been created, it can be mixed with another audio track, e.g., the un-modified track. Alternatively, the user created audio signal is not played back or encoded into the final audio signal; rather, its data is merely used to generate time based video effects.

When the first component is a picture, it can include still images, a film or video. The image can be received by the invention in analog or digital format and can be live, broadcast, or transmitted. The picture signal can be, for example, YUV, YC, RGB, component, composite or IEEE 1394. The signal could be digital video stored on a local or remote computer. The video can also reside on a pre-recorded medium, such as a DVD, VCD, TIVO, DDR, MiniDV, laserdisc, digibeta, d1, d3 or any medium or apparatus that records images.

In an alternative embodiment, the system may analyze a video file to create an output audio file, in which the video file plays normally (sequentially) but the audio file is modified when certain characteristics are detected. The system may then play the video in a normal sequential manner and when the video characteristics are detected, the audio signal is altered. The audio signal modification can include: volume, tempo, frequency, sequence, distortion, tone or any other audio effect. The effect is to view a normal video file while the audio file is periodically distorted based upon the discrete video signal.

One implementation of the invention re-sequences motion picture frames based upon a secondary media signal. This re-sequencing can be conducted in real time, utilizing live or pre-recorded audio or live or pre-recorded video. Playback can occur in real time, and/or can be stored for later playback.

The inventive system is particularly useful in conjunction with live media. In such a case, the media signals processed by the system may include live and/or recorded audio and live and/or recorded video. By inputting the live media data, the system can process the media data to incorporate the substitute component or a media effect by utilizing previously recorded substitute data when a characteristic is detected. Visual effects that can be implemented during a detection of the characteristic can include: varying the camera angle, color, rotation, zoom, pixelation, etc. Alternatively, if multiple cameras are recording the same live performance, the signals received from the different cameras can act as the substitute media signals and data from a second, third, fourth, etc. media source can be inserted when the characteristic is detected. The inventive processing of live media can be configured to output live audio with recorded video, live video with recorded audio, or live video with live audio. Of course any other combination would also be within the purview of the present invention.

Two generalized equations that describe the re-sequencing embodiment when utilizing two media signals are shown below.

| | |
|---|---|
| (1) $O(i) = O_{max} F(S_2(i))$ | Offset calculation |
| (2) $S_3(i) = S_1(O(i) + i)$ | Output media |
| Where: | |
| $S_1(i)$ = Media signal 1 | $0 \leq i \leq (n_1 - 1)$ |
| $S_2(i)$ = Media signal 2 | $0 \leq i \leq (n_2 - 1)$ |
| $S_3(i)$ = Output signal | $0 \leq i \leq (n_1 - 1)$ |
| $F(i)$ = Filter Function | Real Number |
| $O(i)$ = offset at time i | $0 < |O(i)| < O_{max}$ |
| $O_{max}$ = maximum offset | (set by user) |

$S_1$ and $S_2$ represent independent media signals that are used by the algorithm to produce an output signal $S_3$. As discussed, the media signals can be virtually any type of media. In the following description, $S_1$ represents a video signal and $S_2$ represents an audio signal. The "i" represents the sequential indicator. The filter function F can be any linear or non-linear equation that produces a real number. $O_{max}$ is the maximum offset and can be any number that is set by the user.

Equation (1) is the offset calculation. The offset calculation solves the offset based upon the filter function of $S_2(i)$ and has a value when a user designated characteristic is detected in $S_2(i)$. If a characteristic is not detected the filter function does not produce an output and $F(S_2(i))=0$. Consequently, $O(i)=O_{max} F(S_2(i))=0$. If a characteristic is detected by the filter function, the filter function generates a real number that is multiplied by $O_{max}$ to produce a value for $O_i$. In a preferred embodiment, the $O(i)$ value is an integer.

Equation (2) solves the output media $S_3(i)$. If a characteristic is not detected $O(i)=0$ and the output media signal is the same as the corresponding media signal 1, $S_3(i)=S_1(0+i)=S_1(i)$. If a characteristic is detected, $O(i)$ has a value, which may be positive or negative. The $O(i)$ value is added to i to produce an offset value that indicates a frame ahead of or behind the sequential marker "i". Thus, during playback the output media will be the same as media signal 1 until a designated characteristic is detected in media signal 2. When the characteristic is detected, the filter function will produce a value and the output media will be offset from media signal 1. The output media may be output alone or synchronously with media signal 2 or any other media signal.

An example of a common manifestation of the invention is now described. In this example, the invention is implemented as a set of software instructions on a computer and two media signals, one audio ($S_2$) and one video ($S_1$), are stored on the hard drive of a computer. The two media signals (i.e., the video and the sound) are combined and displayed as a new media composition having a sequence of frames, each containing digital data describing, for example, the audio or visual content of the frame. When the composition is played, the frames are output at a composition frame rate. The composition includes the source audio track ($S_2$) and an output video track ($S_3$).

Figure 3:
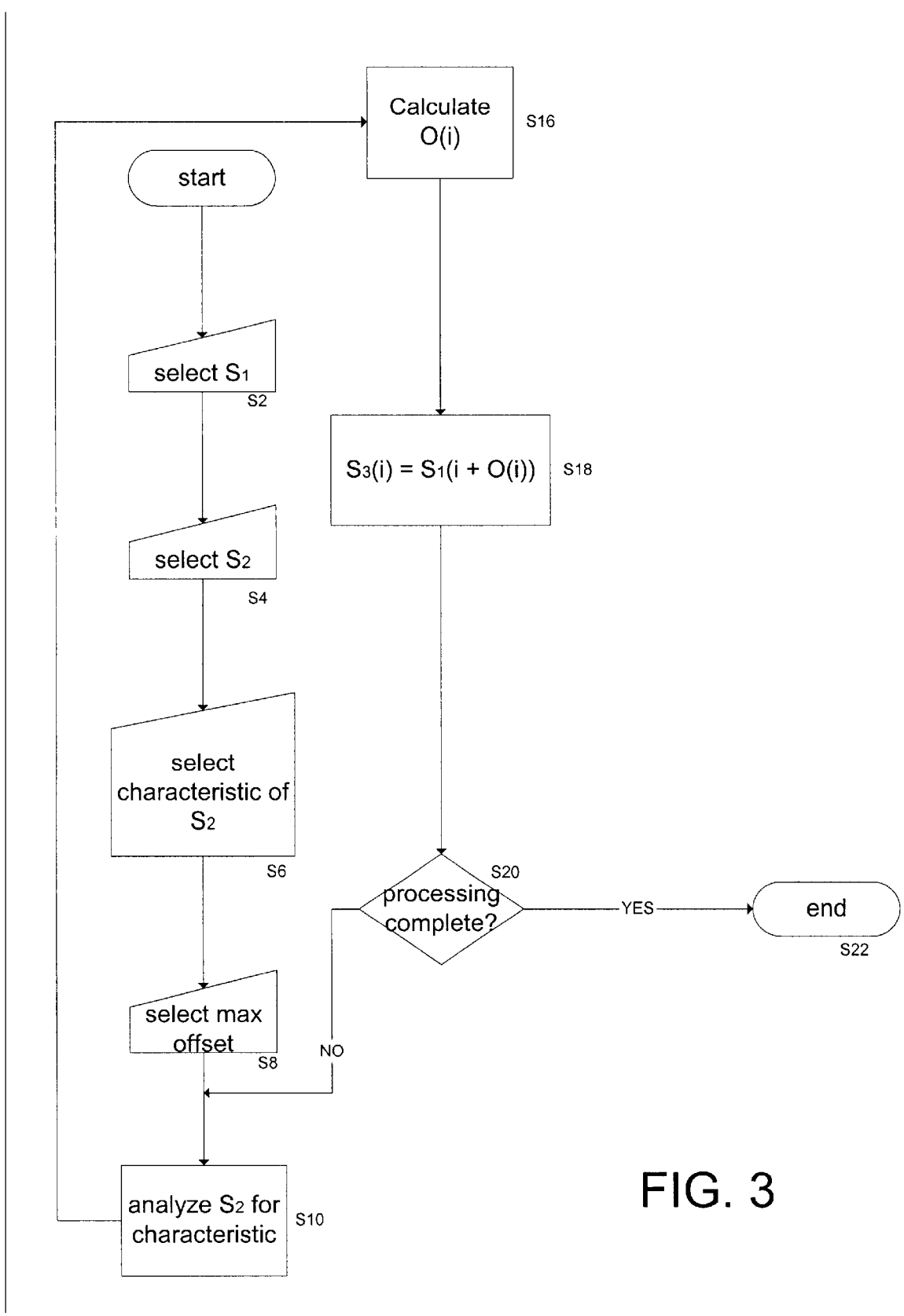
FIG. 3 is a flow chart showing exemplary processing to determine an output stream, according to an aspect of the present invention.

Referring to FIG. 3., the user, with an input device such as a mouse or keyboard, selects the video source ($S_1$) and the audio source ($S_2$), at steps S2 and S4, respectively, and places them on a time line. Of course, more than two sources can be selected and processed but for the sake of simplicity the example only uses two signals.

The user also selects a characteristic of the audio signal, at step S6. If no characteristic is selected, default settings for audio processing are used. An example of an audio characteristic is a frequency range level, such as 50–100 hz. The audio characteristic can be sampled in a direct temporal relationship to the frame rate.

At step S8, the user enters a value for the maximum offset. This variable determines the maximum range from the current frame the invention will use to select a substitute frame. In other words, this value will determine the maximum offset between the source frame and the composition frame to be displayed. Although this variable is described as a fixed value, this number can also be variable. Specifically, the maximum offset can be a function of any input including a characteristic of the media signal. In other embodiments, the maximum offset can be turned off, disabling the inventive media effects system in the event that normal playback is desired.

At step S10, the filtration function occurs. That is, the audio source ($S_2$) is analyzed for the designated characteristic. The filtering may occur at a user selected sampling frequency. The sampling frequency defaults to the frame rate of the source picture component ($S_1$): for NTSC television this is approximately 30 times a second.

Based upon the filtering function, a data set is determined. More specifically, at intervals defined by the sampling frequency, the audio characteristic is sampled and normalized. The normalization occurs so that the substitute frame will not be more than the user selected maximum offset.

In the invention's real time embodiment, step S10 is executed in parallel with steps S16–S18. At step S16, the offset $O(i)$ is calculated based upon equation (1). Subsequently, the output signal is calculated based upon equation (2). After step S18, it is determined whether processing should continue. If so, the process returns to step S10 and repeats. If the processing is determined to be completed, the processing ends at step S22.

In an example, a new media composition at 30 frames per second is created. The new media composition includes two media signals. The first media source signal ($S_1$) is a series of 300 images on a hard drive on a computer. The native playback rate of the motion picture sequence is 30 frames per second. The set $S_1(i)$ contains each frame of the series, $S_1(1)$ being the first frame and $S_1(300)$ being the last frame.

The second media source signal ($S_2$) is an audio track 10 seconds long. Played from the beginning, the track contains 3 seconds of silence, a 60 hz tone with 100% amplitude (level), lasting $1/30^{th}$ of a second, 3 seconds of silence, a 60 hz tone with 50% amplitude lasting $1/30^{th}$ of a second, and 3 and $28/30^{th}$ seconds of silence. $S_2(i)$ contains a set of 300 values.

In this example after the signals are selected at steps S2 and S4, at step S6 the user selects bass tones having a frequency range of 50–70 hz as the audio characteristic. The default 30 frames per second is used for the composition frame rate. At step S8, the user selects the maximum offset to be 60 frames.

At step S10 the filtering function processes the 300 members of $S_2(i)$ by sampling the audio characteristic. In this example, the audio characteristic is not detected when i=1 through 90. Thus, $F(S_2(1))$ through $F(S_2(90))$=0. At i=91, $F(S_2(91))$=100, thus normalized $F(S_2(91))$=1. At i=92–182, the audio characteristic is not detected and $F(S_2(92))$ through $F(S_2(182))$ are 0. At i=183, $F(S_2(i))$=60, thus normalized $F(S_2(183))$=0.6. At i=184 through 300, $F(S_2(i))$=0 and thus $F(S_2(184))$ through $F(S_2(300))$ are 0.

Although the values are described as being normalized between 0 and 1, it is also possible to use a threshold or non-linear function to determine the $F(S_2(i))$ values. In a threshold embodiment, the equations may be $F(S_2(i))$=0 if the detected characteristic has a value<50 and $F(S_2(i))$=1 if the detected characteristic has a value$\geq$50. Thus, if the detected characteristic =60 then $F(S_2(i))$=1. Similarly, any other linear or non-linear formula may be used to define $F(S_2(i))$ as a function of the detected characteristic.

The output media and offset equations (i.e., equations (1) and (2)) are then solved. As described above, it is preferable to use integers, thus, the INTEGER function is employed. At i=1 through 90, $S_3(i)=S_1$ (INTEGER $(0*60+i))=S_1(i)$. At i=91, $S_3(91)=S_1$(INTEGER $(1*60+91))=S_1(151)$. At i=92 through 182, $S_3(i)=S_1(i)$. At i=183, $S_3(183)=S_1$(INTEGER $(0.6*60+183))=S_1(219)$.

The new composition sequence, C(i), is created. It includes 300 images played sequentially. C(i) contain the same frames as $S_1(i)$, with the exception that C(91) would play corresponding frame $S_1(151)$ and C(183) would contain $S_1(219)$.

Table 1 indicates the values of the variables described in the example above.

TABLE 1

| i | Characteristic value | F(S(i)) | $O_{max}$ | O(i) | C(i) |
|---|---|---|---|---|---|
| 1–90 | 0 | 0 | 60 | 1–90 | PS(i) |
| 91 | 100 | 1 | 60 | 151 | PS(151) |
| 92–182 | 0 | 0 | 60 | 92–182 | PS(i) |
| 183 | 60 | 0.6 | 60 | 219 | PS(219) |
| 184–300 | 0 | 0 | 60 | 184–300 | PS(i) |

Thus, the sequence of frames in the new media composition is: $S(1)$-$S_1(90)$, $S_1(151)$, $S1(92)$-$S_1(182)$, $S_1(219)$, $S_1(184)$-$S_1(300)$. Note that $S_1(151)$ and $S_1(219)$ are displayed twice and frames $S_1(91)$ and $S_1(183)$ are not displayed at all.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

What is claimed is:

1. A method for modifying a first input signal comprising a video signal based upon at least one characteristic of a second input signal comprising an audio signal, the method comprising:

analyzing the at least one characteristic of the second input signal;

altering a frame rate of a portion of the first input signal based upon the analysis of the at least one characteristic; and outputting a third video signal comprising the first input video signal including the portion with the altered frame rate.

2. The method of claim 1, in which the analyzing and outputting occur in real time.

3. The method of claim 1, in which the outputting further comprises outputting the second input signal along with the third signal.

4. The method of claim 1, in which the analyzing occurs at a frequency based upon a frame rate of the first input signal.

5. The method of claim 1, in which the first input signal comprises a plurality of input video signals;

in which the third signal comprises a plurality of output video signals;

in which the at least one characteristic comprises a plurality of characteristics, each characteristic being associated with one of the input video signals;

in which the modifying further comprises modifying each of the input video signals based upon the analysis of the associated characteristics; and in which the outputting further comprises outputting each modified output video signal.

6. The method of claim 1, in which the first input signal comprises a plurality of layers;

in which the third signal comprises the plurality of layers;

in which the at least one characteristic comprises a plurality of characteristics, each characteristic associated with one of the layers;

in which the modifying further comprises modifying each of the layers based upon the analysis of the associated characteristics; and in which the outputting further comprises outputting each modified layer.

7. A method for resequencing a first input signal, which has a series of frames, each having a frame number, based upon at least one characteristic of a second input signal, the method comprising:

analyzing the at least one characteristic of the second input signal;

for each frame in the series of frames, calculating an offset based upon the analyzing, the offset being added to the frame number to obtain an output frame number; and outputting a third signal in a playback sequence using the output frame numbers.

8. The method of claim 7, in which the first input signal comprises a video signal, the second input signal comprises an audio signal, and the third signal comprises a video signal.

9. The method of claim 7, in which the analyzing and outputting occur in real time.

10. The method of claim 7, in which the calculating further comprises calculating based upon a user defined maximum offset.

11. The method of claim 10, in which the offset dynamically varies.

12. The method of claim 8,
in which the first input signal comprises a plurality of input video signals each having a linear playback sequence;
in which the third signal comprises a plurality of output video signals;
in which the at least one characteristic comprises a plurality of characteristics, each characteristic being associated with one of the input video signals;
in which the calculating further comprises calculating an offset for each of the output video signals based upon the analysis of the associated characteristics to generate an output frame number for each output video signal; and
in which the outputting further comprises outputting each output video signal in accordance with its output frame numbers.

13. The method of claim 8,
in which the first input signal comprises a plurality of input layers;
in which the third signal comprises the plurality of output layers;
in which the characteristic comprises a plurality of characteristics, each characteristic associated with one of the output layers;
in which the calculating further comprises calculating an offset for each of the output layers based upon the analysis of the associated characteristics to generate an output frame number for each output layer; and
in which the outputting further comprises outputting each output layer in accordance with its output layer sequence.

14. A method for outputting an output video signal, comprising a series of frames, based upon at least one characteristic of an input audio signal, the method comprising:
analyzing the at least one characteristic of the input audio signal;
for each frame in the series of frames, calculating an offset based upon the analyzing, the offset being added to the frame number to obtain an output frame number;
controlling an external device based upon the analysis of the at least one characteristic; and
outputting the output video signal using the controlled external device in a playback sequence using the output frame numbers.

15. The method of claim 14, in which the analyzing and outputting occur in real time.

16. A computer readable medium storing a computer program for modifying a first input signal comprising a video signal, based upon at least one characteristic of a second input signal comprising an audio signal, the medium comprising:
an analyzing source code segment that analyzes the at least one characteristic of the second input signal;
a modifying source code segment that modifies a frame rate of a portion of the first input signal based upon the analysis of the at least one characteristic; and
an output source code segment that outputs a third video signal comprising the first input video signal including the portion with the altered frame rate.

17. The medium of claim 16, in which the analyzing source code segment analyzes at a frequency based upon a frame rate of the first input signal.

18. The medium of claim 16, in which the analyzing source code segment and the output source code segment process in real time.

19. The medium of claim 16, in which the output source code segment further comprises outputting the second input signal along with the third signal.

20. The medium of claim 16,
in which the first input signal comprises a plurality of input video signals;
in which the third signal comprises a plurality of output video signals;
in which the at least one characteristic comprises a plurality of characteristics, each characteristic being associated with one of the input video signals;
in which the modifying source code segment further comprises modifying each of the input video signals based upon the analysis of the associated characteristics; and
in which the output source code segment further comprises outputting each modified output video signal.

21. The medium of claim 16,
in which the first input signal comprises a plurality of layers;
in which the third signal comprises the plurality of layers;
in which the at least one characteristic comprises a plurality of characteristics, each characteristic associated with one of the layers;
in which the modifying source code segment further comprises modifying each of the layers based upon the analysis of the associated characteristics; and
in which the output source code segment further comprises outputting each modified layer.

22. A computer readable medium storing a computer program for resequencing a first input signal, which has a series of frames, each having a frame number, based upon at least one characteristic of a second input signal, the medium comprising:
an analyzing source code segment that analyzes the at least one characteristic of the second input signal;
a calculating source code segment that, for each frame in the series of frames, calculates an offset based upon the analysis, the offset being added to the frame number to obtain an output frame number; and
an output source code segment that outputs a third signal in a playback sequence using the output frame numbers.

23. The medium of claim 22, in which the first input signal comprises a video signal, the second input signal comprises an audio signal, and the third signal comprises a video signal.

24. The medium of claim 22, in which the analyzing source code segment and the output source code segment process in real time.

25. The medium of claim 22, in which the calculating source code segment further comprise calculating based upon a user defined maximum offset.

26. The medium of claim 25, in which the offset dynamically varies.

27. The medium of claim 23,
in which the first input signal comprises a plurality of input video signals each having a linear playback sequence;
in which the third signal comprises a plurality of output video signals;

in which the at least one characteristic comprises a plurality of characteristics, each characteristic being associated with one of the input video signals;

in which the calculating source code segment further comprises calculating an offset for each of the output video signals based upon the analysis of the associated characteristics to generate an output frame number for each output video signal; and in which the output source code segment further comprises outputting each output video signal in accordance with its output frame numbers.

28. The medium of claim 23, in which the first input signal comprises a plurality of input layers;

in which the third signal comprises the plurality of output layers;

in which the characteristic comprises a plurality of characteristics, each characteristic associated with one of the output layers;

in which the calculating source code segment further comprises calculating an offset for each of the output layers based upon the analysis of the associated characteristics to generate an output frame number for each output layer; and in which the output source code segment further comprises outputting each output layer in accordance with its output layer sequence.

29. A computer readable medium storing a computer program for outputting an output video signal, comprising a series of frames, based upon at least one characteristic of an input audio signal, the medium comprising:

an analyzing source code segment that analyzes the at least one characteristic of the input signal;

an offset source code segment, for calculating for each frame in the series of frames, an offset based upon the analyzing, the offset being added to the frame number to obtain an output frame number;

a controlling source code segment that controls an external device based upon the analysis of the at least one characteristic; and an output source code segment that outputs the output signal using the controlled external device in a playback sequence using the output frame numbers.

30. The medium of claim 29, in which the analyzing source code segment and the output source code segment occur in real time.

31. A method for resequencing a first input signal, comprising a series of frames, back based upon at least one characteristic of a second input signal, the method comprising:

analyzing the at least one characteristic of the second input signal;

for each frame in the series of frames, calculating an offset based upon the analyzing, the frame number being altered based upon the offset to obtain an output frame number; and outputting a third signal in a playback sequence using the output frame numbers.

32. A computer readable medium storing a computer program for resequencing a first input signal, comprising a series of frames, based upon at least one characteristic of a second input signal, the medium comprising:

an analyzing source code segment that analyzes the at least one characteristic of the second input signal;

an offset calculating source code segment that calculates, for each frame in the series of frames, an offset based upon the analyzing, the frame number being altered based upon the offset to obtain an output frame number; and an output source code segment that outputs a third signal in a playback sequence using the output frame numbers.

33. The method of claim 1, in which the first input signal comprises a plurality of input signals.

34. The medium of claim 16, in which the first input signal comprises a plurality of input signals.

35. An apparatus for resequencing a first input signal, which has a series of frames, each having a frame number, based upon at least one characteristic of a second input signal, the apparatus comprising:

an analyzer that analyzes the at least one characteristic of the second input signal;

a calculator that calculates, for each frame in the series of frames, an offset based upon the analyzing, the frame number being altered based upon the offset to obtain an output frame number; and an output device that outputs a third signal in a playback sequence using the output frame numbers.

36. An apparatus for resequencing a first input signal, which has a series of frames, each having a frame number, based upon at least one characteristic of a second input signal, the apparatus comprising:

an analyzer that analyzes the at least one characteristic of the second input signal;

a calculator that calculates, for each frame in the series of frames, an offset based upon the analyzing, the offset being added to the frame number to obtain an output frame number; and an output device that outputs a third signal in a playback sequence using the output frame numbers.

37. An apparatus for modifying a first input video signal based upon at least one characteristic of an input audio signal, the apparatus comprising:

an analyzer that analyzes the at least one characteristic of the input audio signal;

a frame rate modification system that alters a frame rate of a portion of the first input video signal based upon the analysis of the at least one characteristic; and an output device that outputs a second video signal comprising the first input video signal including the portion with the altered frame rate.

* * * * *

UNITED STATES PATENT AND TRADEMARK OFFICE
CERTIFICATE OF CORRECTION

PATENT NO. : 6,744,974 B2
DATED : June 1, 2004
INVENTOR(S) : M. Neuman

It is certified that error appears in the above-identified patent and that said Letters Patent is hereby corrected as shown below:

Column 15,
Line 50, before "based" delete "back".

Column 16,
Line 1, "outpuffing" should be -- outputting --.

Signed and Sealed this

Fifth Day of April, 2005

JON W. DUDAS
*Director of the United States Patent and Trademark Office*